United States Patent [19]

Edensor

[11] Patent Number: 5,536,130
[45] Date of Patent: Jul. 16, 1996

[54] EXTERNAL STORAGE FOR AUTOMOBILES

[76] Inventor: Kieron J. D. Edensor, 3 Cheyney Ave., Salhouse, Norwich, Norfolk NR13 6RJ, United Kingdom

[21] Appl. No.: 377,531

[22] Filed: Jan. 23, 1995

[30] Foreign Application Priority Data

Jan. 21, 1994 [GB] United Kingdom ............... 9401114

[51] Int. Cl.⁶ ........................................ B60P 9/00
[52] U.S. Cl. .................... 414/462; 414/917; 224/495; 224/502; 224/509
[58] Field of Search ............... 414/462, 465, 414/466, 917, 733; 224/488, 489, 495, 502, 509, 511

[56] References Cited

U.S. PATENT DOCUMENTS

| | | | |
|---|---|---|---|
| 3,202,332 | 8/1965 | Walker | 224/502 |
| 4,089,554 | 5/1978 | Myers | 224/509 |
| 4,213,729 | 7/1980 | Cowles et al. | 414/462 |
| 4,756,457 | 7/1988 | Polk | 224/509 |
| 4,771,926 | 9/1988 | Anderson et al. | 224/509 |
| 5,038,983 | 8/1991 | Tomososki | 414/462 |
| 5,199,842 | 4/1993 | Watt et al. | 414/462 |

FOREIGN PATENT DOCUMENTS 8002785  12/1981  Netherlands .................. 414/462

*Primary Examiner*—David A. Bucci
*Assistant Examiner*—Douglas Hess
*Attorney, Agent, or Firm*—Galgano & Burke

[57] ABSTRACT

A storage container for mounting externally to the rear of an automobile and which comprises a substantially rigid container the container having an articulated mounting to enable it to be mounted to the rear of an automobile and when mounted be movable between a raised position providing ground clearance for forward travel of the automobile and a lowered position proximate to the ground to facilitate loading and unloading of the container and to provide clearance to allow a rear upwardly lifting door of the automobile to be opened.

6 Claims, 3 Drawing Sheets

EXTERNAL STORAGE FOR AUTOMOBILES

FIELD OF THE INVENTION

The present invention relates to an external storage container for automobiles which is especially, but not necessarily exclusively, suitable for storage of a foldable wheelchair when folded.

BACKGROUND TO THE INVENTION

Those who are physically disabled and reliant upon a combination of a wheelchair and an automobile or other small passenger vehicle to travel around frequently experience difficulty in transferring their wheelchair to and from the automobile.

Even with a collapsible/foldable wheelchair and a vehicle in which there is adequate capacity to accommodate the wheelchair, the loading and unloading of the wheelchair can be difficult, time consuming and damaging to the upholstery of the vehicle and reduces the internal space of the vehicle. Furthermore, such loading and unloading generally requires assistance of the disabled person by one or more able bodied persons.

To overcome these problems a wide range of carrying devices have been proposed for mounting externally of an automobile to transport a wheelchair folded or otherwise. Examples of such proposals include U.S. Pat. Nos. 4,934,894, 3,937,376, 4,738,581, 4,411,580, 4,697,975, EP-A-0 025 803, U.S. Pat. Nos. 4,400,129, 4,397,607, and GB-A-2,210,856. These systems make use of carrying devices mounted to the rear of the vehicle. Without exception, all suffer the significant drawback that the stored wheelchair is effectively unprotected. In all these cases, the folded wheelchair mounted on the carrier at the rear of the vehicle is liable to be spattered by spray from the road surface and is unprotected in the event of rear end shunt accidents.

Furthermore, enclosing of the wheelchair in an external storage container mounted to the rear of the automobile potentially creates an obstruction to the opening of a rear upwardly lifting door of the automobile rendering the rear interior of the car relatively inaccessible.

It is a general object of the present invention to provide an external wheelchair storage container for automobiles which overcomes these problems.

SUMMARY OF THE INVENTION

According to the present invention there is provided a storage container for mounting externally to the rear of an automobile and which comprises a substantially rigid container the container having an articulated mounting to enable it to be mounted to the rear of an automobile and when mounted be movable between a raised position providing ground clearance for forward travel of the automobile and a lowered position proximate to the ground to facilitate loading and unloading of the container and to provide clearance to allow a rear upwardly lifting door of the automobile to be opened.

Preferably the container has a main opening for loading and unloading with an openable and closeable door wherein the door is hinged along one edge to drop open to the ground and thereby provide a ramp for loading and unloading of the container.

More preferably the container has two or more said main openings with, yet more preferably, one opening in each side and optionally also an opening in the rear of the container.

Preferably the container mounting is a pivotal mounting to enable the container to tilt in the vertical plane.

Preferably the mounting further comprises an articulation arm having a first end and a second end, the first end being pivotally attached to the vehicle and the second end being pivotally attached to the container to enable the container to be moved to either side of the point of pivotal attachment to the vehicle, while remaining substantially upright.

Advantageously the mounting comprises a pair of side by side said articulation arms which are suitably substantially parallel.

More preferably yet, the mounting further comprises a resilient biasing means to assist in moving the container back to its raised position.

Where the articulation arms are substantially parallel, the resilient biasing means suitably comprises a spring (which may be mechanical or a hydraulic or pneumatic piston) extending diagonally between a point at or near the first end of one of the pair of articulation arms and a point at or near the second end of the other of the pair of articulation arms.

Alternatively, part of the mounting may comprise one or more posts attached to the front, in use, of the container (being the face of the container adjacent to the rear of the vehicle) and one or more corresponding sockets rigidly fixed to the rear of the automobile, in use, into which the post(s) are slotted to mount the container for use.

Suitably the mounting is adapted to be fixed to the two-bar hitch of the automobile, preferably between the base plate and hook portion of the tow-bar hitch.

BRIEF DESCRIPTION OF THE DRAWINGS

Preferred embodiments of the present invention will now be more particularly described, by way of example, with reference to the accompanying drawings, wherein.

DESCRIPTION OF THE PREFERRED EMBODIMENT

Figure 1:
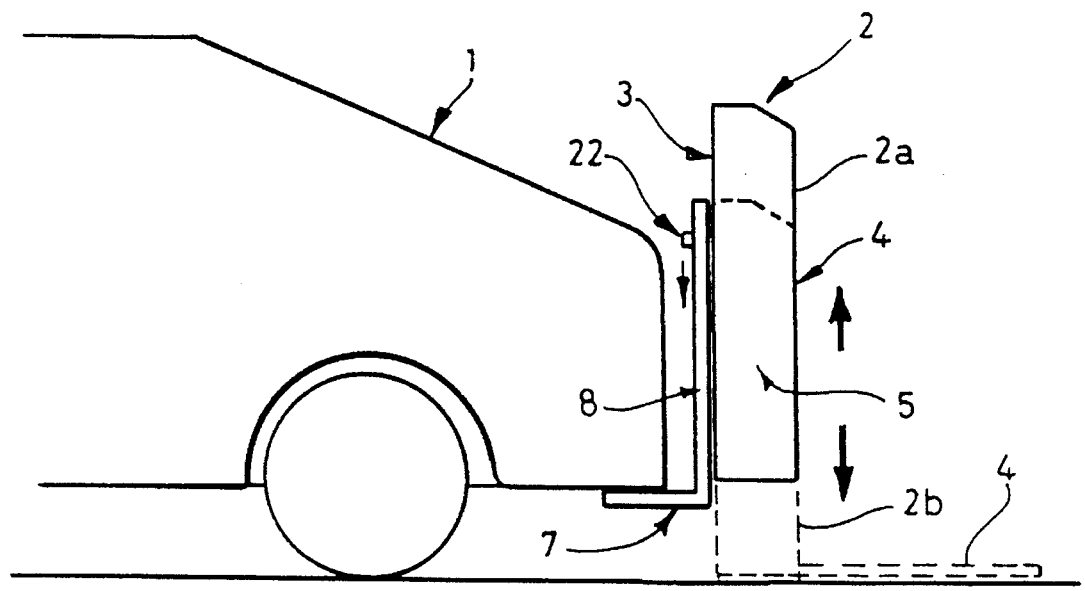
FIG. 1 is a schematic side elevation of a first embodiment of the invention, in which the container is vertically slidably mounted to the rear of a car.
Figure 4:
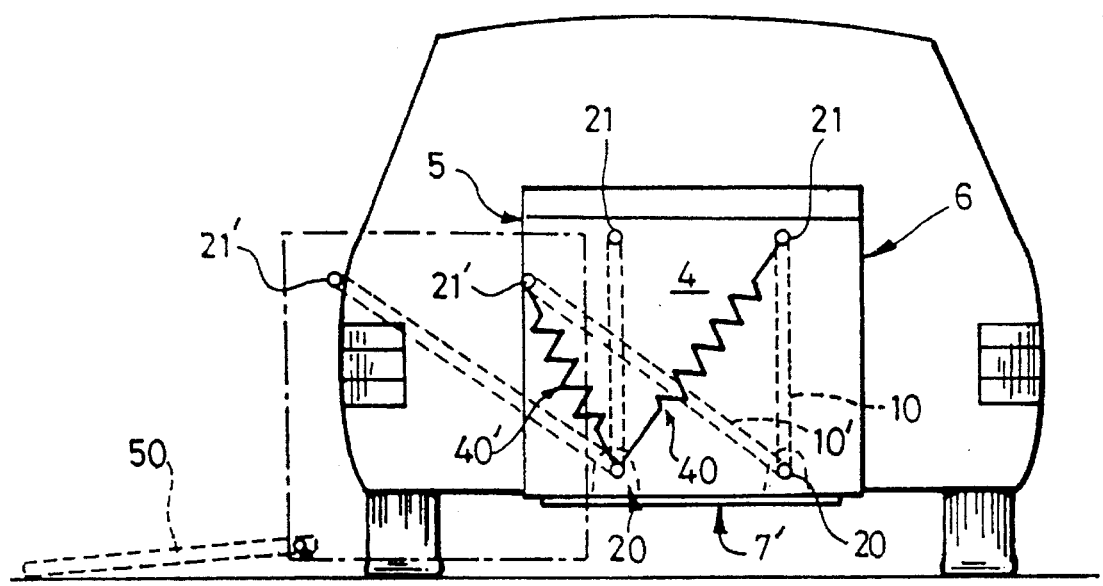
FIG. 4 is a rear end elevation of the container of the FIG. 3 embodiment.

Referring to FIG. 1, to the rear of a vehicle 1 is mounted a substantially rigid box-shaped container 2 having broad front and rear walls 3, 4 and comparatively narrow side walls 5, 6. The rear elevation of the container is substantially as illustrated in FIG. 4 and presents a surface on which the vehicle registration plate and/or vehicle signal lights may be mounted.

The container 2, as shown, is adapted to accommodate a foldable wheelchair in folded state. The rear wall 4 of the container 2 is hinged along its lower most edge to provide a door which, when opened, enables the folded wheelchair to be installed within the container 2.

The container 2 is mounted to the rear of the vehicle via a mounting frame which comprises a base plate 7 which is bolted, in use, to the underside of the vehicle chassis at the rear end of the vehicle 1. A post (or 2 or more posts) 8 extends upwardly from the base plate 7 and to this the container 2 is fastened by a pin-in-slot arrangement 22 or in such other manner as to be vertically slidable from a raised first position 2a for transit to a lowered second position 2b for loading and unloading of the container 2.

Loading and unloading is accomplished by first lowering the container 2 to a substantially ground engaging position 2b either manually or by a motorised mechanism which may comprise a, hydraulic or pneumatic piston (not shown). The door formed by the wall 4 is then swung open and the folded wheelchair inserted or removed from within the container 2.

In preference to having a rear wall door 4, the container may have a tilt down opening door 50 in one or both the sides 5 or 6 and preferably that side which is most commonly proximate to the curb of a pavement when the car is parked, enabling the wheelchair to be wheeled in and out via the ramp formed by the door 50 from and to the pavement.

Figure 2:
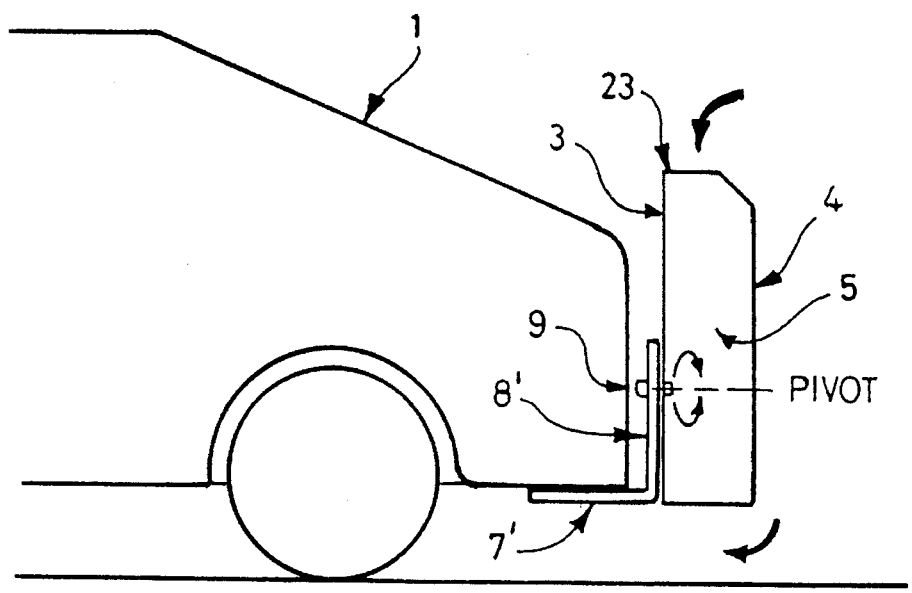
FIG. 2 is a schematic side elevation of a second embodiment, in which the container is pivotally mounted to the rear of a car.

In the second embodiment shown in FIG. 2, the mounting of the container 2 to the vehicle comprises a base plate 7' and upright 8' which differ from the first embodiment in that the container 2 is fastened to the upright by a pivot pin 9 which enables the container 2 to pivot thereabout from a substantially vertical orientation to a substantially horizontal orientation. In this embodiment, the opening for access into the container 2 is suitably provided in that wall of the container 2 which, in use, forms the top 23 of the container 2 and faces the pavement in the horizontal orientation. This will facilitate the loading of the folded wheelchair into the container 2 by avoiding the need to raise the wheelchair in doing so.

In contrast to the first embodiment, the second embodiment has the advantage of facilitating raising and lowering of the container 2 manually by the operator, since the mechanical effort required is far less.

Figure 3:
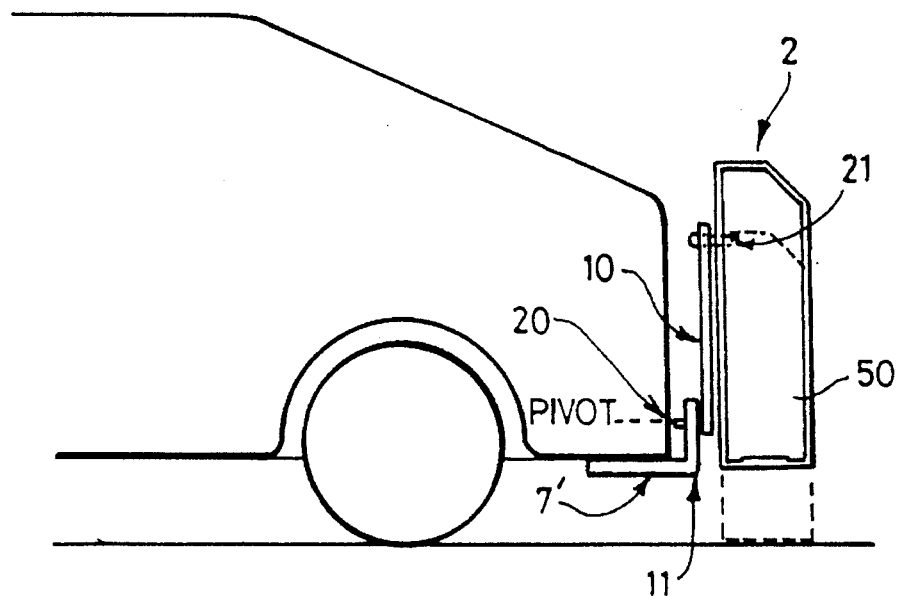
FIG. 3 is a schematic side elevation of a third embodiment in which the container is pivotally mounted to the rear of a car via an articulation arm.

Turning now to FIGS. 3 and 4, these show a third embodiment of the invention in which the container 2 is pivotally mounted to the rear of a vehicle but, in contrast to the second embodiment, the container 2 is mounted via a pair of substantially parallel articulation arms 10. Each articulation arm 10 is pivotally mounted by a respective base pivot 20 to a pivot block 11 on the base plate 7' and the container 2 is pivotally mounted by a respective upper end pivot 21 to each articulation arm 10 proximate that end of the arm 10 remote from the base pivot 20.

A compression spring (mechanical spring or hydraulic or pneumatic piston) 40 is provided extending diagonally between the base pivot 20 of one articulation arm 10 and the upper end pivot 21 of the other of the pair of articulation arms. This spring 40 facilitates the process of lowering and raising the container by biasing the container to move upwardly. Where a piston is used this may be powered to negate need for any manual effort to be employed.

The compression of the spring 40 when the container 2 is lowered to the ground is illustrated in FIG. 4 in which the lowered state of the container is indicated by broken lines and the position of the articulation arms 10 and of the spring 40 in the lowered state are denoted as arms 10' and spring 40', respectively.

The articulation arms 10 provided an advantage over the single pivoting arrangement of the embodiment of FIG. 2 in that they enable the container 2 to be displaced laterally of the longitudinal axis of the vehicle to thereby position the container 2 upright adjacent to the curb of a pavement for greater ease of loading and unloading and, furthermore, they thereby also allow greater access to the boot of the vehicle 1 to enable articles to be loaded or unloaded therefrom.

In common with all the other embodiments, a locking mechanism is provided to lock the container 2 in the raised state for transit. For the pivotal mounting embodiments, the lock may comprise a locking pin which is inserted into the upright 8' or hinge block 11 to prevent pivotal movement.

Figure 5:
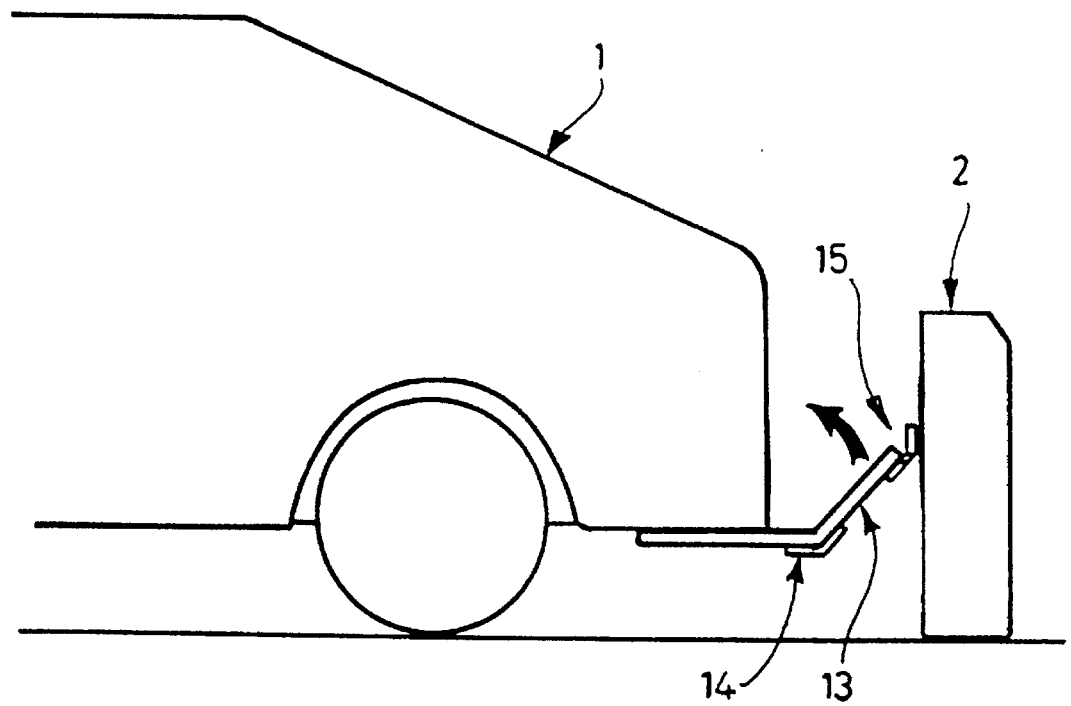
FIG. 5 is a schematic side elevation of a fourth embodiment.

A further variant is shown in FIG. 5 and employs an articulating arm 13 which is hinged 14 to a base plate 7' and hinged 15 to the container 2 at opposing ends of the arm 13. Unlike the articulation arm 10 of the third embodiment, the arm 13 pivotally moves longitudinally of the vehicle rather than laterally.

For even greater versatility in deployment of the container 2 in a lowered state, the mounting may incorporate a combination of this longitudinally pivoting arrangement with the laterally pivoting arrangement of the third embodiment so that the container 2 may be lowered by shifting to one side and/or lowered by shifting rearwardly of the vehicle. This may be of particular use where the space surrounding the parked vehicle is limited by other parked vehicles or obstructions.

Figure 6:
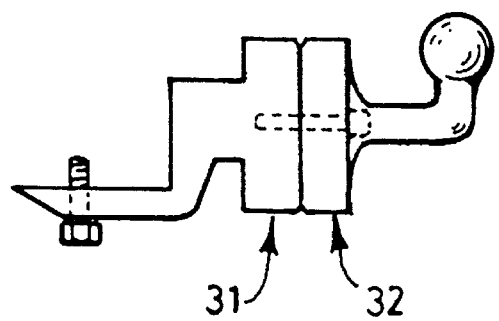
FIG. 6 is a schematic side elevation of a conventional two-bar hitch.

For optimum ease of fitment to an automobile, where the automobile has a conventional two-bar hitch as illustrated in FIG. 6, comprising a base plate portion 31 and hook portion 32, the mounting of the container suitably has a fixture plate which may be bolted or otherwise fastened to the base plate portion 31 of the hitch sandwiched between the base plate portion 31 and hook portion 32. The means by which the container is fastened in place is suitably a quick release fastening for ease of demountability of the container when not required.

Although described above with respect to several specific preferred embodiments, numerous alternative embodiments are conceivable within the scope of the invention.

The storage container is especially suitable for storage of folded wheelchairs but may be used to store slim-line unfoldable wheelchairs or other items such as, for example, camping or fishing equipment or a childs push-chair. The container may even be used as a display cabinet for a travelling salesperson and have a transparent rear face 4.

I claim:

1. A storage container for mounting externally to the rear of an automobile and which comprises a substantially rigid container, the container having an articulated mounting to enable it to be mounted to the rear of an automobile and when mounted be movable between a raised position providing ground clearance for forward travel of the automobile and a lowered position proximate to the ground to facilitate loading and unloading of the container and to provide clearance to allow a rear upwardly lifting door of the automobile to be opened, said mounting comprising an articulation arm having a first end and a second end, the first end being pivotally attached at a point of pivotal attachment to the automobile and the second end being pivotally attached to the container to enable the container to be moved to either side of the point of pivotal attachment to the automobile, while remaining substantially upright.

2. A storage container as claimed in claim 1 wherein the container has a main opening for loading and unloading with an openable and closeable door and the door is hinged along one edge to drop open to the ground and thereby provide a ramp for loading and unloading of the container.

3. A storage container as claimed in claim 1, wherein the container mounting is a pivotal mounting to enable the container to tilt in a vertical plane.

4. A storage container is claimed in claim 1, wherein the mounting comprises a pair of side by side said articulation arms which are suitably substantially parallel.

5. A storage container as claimed in claim 4, wherein the mounting further comprises a resilient biasing means to assist in moving the container back to its raised position.

6. A storage container as claimed in claim 5, wherein the resilient biasing means comprises a spring extending diagonally between a point at or near the first end of one of the pair of a articulation arms and a point at or near the second end of the other of the pair of articulation arms.

* * * * *